Patented Nov. 26, 1940

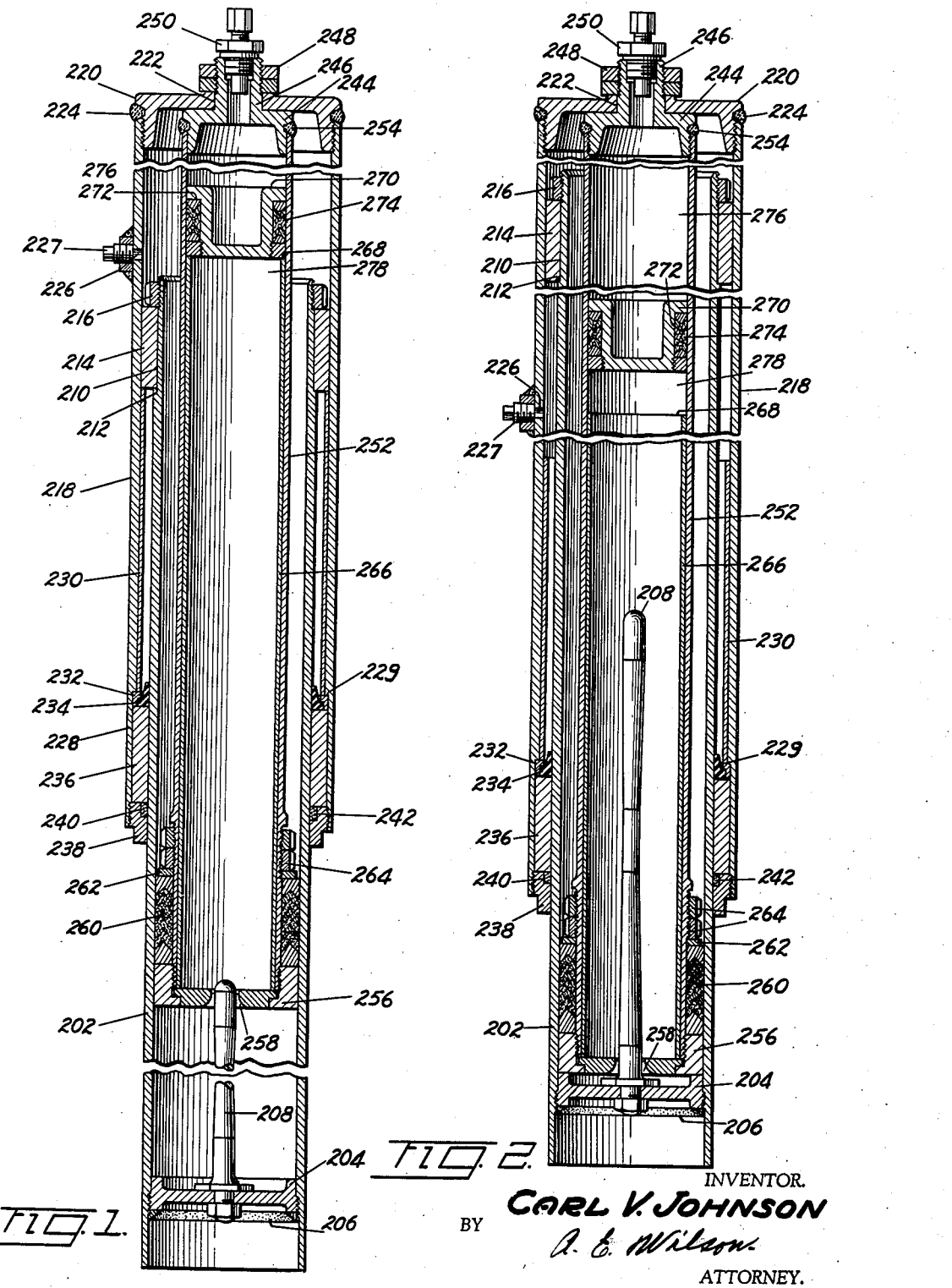

2,222,845

UNITED STATES PATENT OFFICE 2,222,845

SHOCK ABSORBING MEANS

Carl V. Johnson, South Bend, Ind.

Original application May 19, 1937, Serial No. 143,456. Divided and this application August 17, 1939, Serial No. 290,647

7 Claims. (Cl. 267—64)

This invention relates to shock absorbing means for the landing gear of airplanes, and is illustrated as embodied in an airplane shock strut of the type having telescoping tubes provided with means for forcing a liquid through a small controlled orifice to absorb the landing shock.

An object is to provide such a shock strut with simple and effective means for yieldingly carrying the load of the plane during taxying, without interfering with the shock absorbing action during landing. Preferably this is accomplished by providing the strut with a floating piston held on a seat by a fluid pressure which is high enough to carry the taxying load, the pressure in the strut building up as it telescopes during landing to the point where it lifts the floating piston off its seat after the shock of landing has been absorbed.

The above and other objects and features of the invention, and various novel structures and arrangements involved therein, will be apparent from the following description of the illustrative embodiment shown in the accompanying drawing, in which:

Figures 1 and 2 are vertical longitudinal sections of the strut, respectively in its extended and in its collapsed or telescoped taxying positions.

The embodiment of the invention illustrated in the drawing includes a cylindrical casing 202 having threaded in its lower end a diaphragm or support 204 secured against displacement as by a welding bead 206. The bead also serves to seal this end of the casing against leakage; and suitably mounted on the support 204 within the casing is a metering pin 208 of conventional type. The upper end of the casing 202 has a reduced portion 210 providing an annular shoulder 212, and a collar 214 sleeved on the reduced portion and abutting the annular shoulder is held against displacement by a retaining ring 216 threaded on the reduced portion.

A casing 218 has its upper end closed as by a cap 220 provided with a concentric opening 222. The cap is threaded on the upper end of the casing and is secured against displacement by a welding bead 224. This bead also serves to seal the union between the casing and the cap. Arranged in the wall of the casing 218 is a filling opening 226 for the introduction of lubricant into the strut and the opening is normally closed as by a plug 227.

The casing 218 telescopes the casing 202 and is adapted to slide smoothly on the collar 214. The lower end of the casing 218 has an internal enlarged portion 228 providing an annular shoulder 229, and fitted snugly in the casing above the enlarged portion is a cylindrical section 230 adapted to abut the collar 214 when the strut is in fully extended position. A flexible washer 232 fitted in the enlarged portion 228 and abutting the annular shoulder 229 supports the cylindrical section 230.

A cup 234 for inhibiting the seepage of lubricant from the strut embraces the casing 202, and the cup is clamped between the washer 232 and a collar 236 fitted snugly in the enlarged portion 228 and adapted to slide smoothly on the casing 202. The collar 236 is held against displacement by a retaining ring 238 threaded on the open end of the casing, and the retaining ring has a gland 240 filled with suitable material 242.

A short cylindrical fitting 244 is suitably secured on the back of the cap 220 within the casing 218. This fitting includes a concentric sleeve 246 extending into the opening 222 in the cap. Locknuts 248 threaded on the sleeve 246 serve to retain the fitting against displacement, and mounted in the sleeve is a plug 250 including a check valve, not shown.

A cylindrical casing 252 has its upper end secured to the fitting 244 as by a welding bead 254. This casing depends from the fitting 244 into the casing 202 and has secured on its lower end a piston 256 reciprocable in the casing 202. The piston is provided with a concentric orifice 258 adaptable for cooperation with the metering pin 208, and fitted on the casing 252 back of the piston are suitable packing rings 260 secured against displacement by a ring 262 and locknuts 264.

The casing 252 has fitted snugly therein a cylindrical casing 266 seated on the back of the piston and extending upwardly to substantially the top of the casing 202 when the strut is fully extended so as to provide an annular shoulder 268 preferably arranged above the upper end of the casing 202.

A floating piston 270 provided with a packing chamber 272 having therein suitable packing rings 274 divides the casing 252 into two chambers 276 and 278. The chamber 276 is adapted to be filled with either air or gas under high pressure introduced through the valve in plug 250 in the sleeve 246. The pressure on the air or gas in the chamber 276 normally retains the piston 270 on the annular shoulder 268 when the strut is not subjected to load. The chamber 278 communicates with the casing 202.

Assuming that the strut is filled with the proper quantity of liquid before being assembled, under these conditions, impact of landing forces the liquid in the casing 202 upwardly through the orifice 258 in the piston 256 past the metering pin 208 into the chamber 278. This results in effectively damping the initial shock of landing. During this operation the fluid rises in the chamber 278 and imposes pressure on the back of the floating piston 270. This results in movement of the piston from its seat on the annular shoulder 268 against the resistance of the compressed air or gas in the chamber 276. A predetermined portion of the shock of landing having been absorbed previously to the rise of the fluid in the chamber 278 to an elevation sufficiently high to engage the piston, the load is now partially transferred to the piston 270 and is resiliently supported without shock or undesirable vibrations.

When the airplane ascends, the strut returns to its normal position. In assuming this position the air or gas under pressure in the chamber 276 returns the floating piston 270 to its seat on the annular shoulder 268. This results in relative movement between the casings 202 and 218 by forcing the liquid into the casing 202, and further relative movement of the casings 202 and 218 is incidental to the weight of the gearing attached to the lower end of the casing 202. The weight of the gearing extends the strut until the collar 214 on the casing 202 engages the upper end of the casing 230, and when in this position the strut is fully extended.

While the invention has been described in connection with one specific embodiment, the principles involved are susceptible of numerous other applications that will readily occur to persons skilled in the art. The invention is, therefore, to be limited only as indicated by the scope of the appended claims. This application is a division of my application No. 143,456, filed May 19, 1937, patented April 16, 1940, No. 2,197,474.

I claim:

1. An airplane shock absorbing strut comprising telescopic casing, a metering pin carried by one of the casings, an inner casing carried by the other casing, an orificed piston carried by the inner casing for cooperation with the pin, a floating piston in the inner casing, means for limiting movement of the floating piston in one direction, and means for limiting extension of the casings.

2. An airplane shock absorbing strut comprising telescopic casings closed at their outer ends, means for limiting extension of the casings, a metering pin carried by one of the casings, an inner casing carried by the other casing, an orificed piston on the inner casing for cooperation with the pin, a floating piston in the inner casing, and means for limiting movement of the floating piston in one direction.

3. A shock strut having telescoping casings, a floating piston in the inner casing held on a seat under a heavy enough fluid pressure to carry a taxying load, fluid metering means interconnecting said casings, and means operated by the telescoping of said casings in absorbing the shock of landing to lift said piston off its seat and interpose said heavy taxying pressure to resist further collapsing of said strut.

4. A shock strut having telescoping casings, a floating piston in the inner casing held on a seat under a heavy enough fluid pressure to carry a taxying load, and means operated by the telescoping of said casings in absorbing the shock of landing to lift said piston off its seat and interpose said heavy taxying pressure to resist further collapsing of said strut.

5. An airplane shock strut comprising telescopic casings, an inner casing carried by one casing closed to form an orificed piston, a floating piston within said inner casing, and means to restrain the stroke of said floating piston to the part of the casing removed from the orifice.

6. A telescoping airplane shock strut comprising a cylinder tube, a plunger tube slidably mounted therein containing orifice means and closed to form a piston, a floating piston within said piston tube, and means to restrain the travel of the floating piston to the part of the piston tube removed from the orifice means.

7. A shock strut comprising a hydraulic fluid chamber, a telescoping gaseous chamber adapted to reciprocate within said chamber, means interconnecting said chambers, a piston adapted to reciprocate in said gaseous chamber, and a seat to restrain the stroke of said piston causing it to remain out of contact of hydraulic fluid for at least the major part of the reciprocatory stroke of the gaseous chamber within the hydraulic fluid chamber.

CARL V. JOHNSON.